United States Patent
Mao et al.

(10) Patent No.: US 11,414,065 B2
(45) Date of Patent: Aug. 16, 2022

(54) HYBRID ELECTRIC VEHICLE SYSTEM AND CONTROL METHOD

(71) Applicant: Quantentech Limited, Grand Cayman (KY)

(72) Inventors: Hengchun Mao, Allen, TX (US); Lurong Ye, Richardson, TX (US)

(73) Assignee: Quantentech Limited, Grand Cayman (KY)

(*) Notice: Subject to any disclaimer, the term of this patent is extended or adjusted under 35 U.S.C. 154(b) by 321 days.

(21) Appl. No.: 16/701,280

(22) Filed: Dec. 3, 2019

(65) Prior Publication Data

US 2020/0189561 A1    Jun. 18, 2020

Related U.S. Application Data

(60) Provisional application No. 62/780,738, filed on Dec. 17, 2018.

(51) Int. Cl.
*B60W 20/10* (2016.01)
*B60W 20/50* (2016.01)
*B60K 6/445* (2007.10)

(52) U.S. Cl.
CPC ............ *B60W 20/10* (2013.01); *B60W 20/50* (2013.01); *B60K 6/445* (2013.01)

(58) Field of Classification Search
CPC ...... B60W 20/10; B60W 20/50; B60W 20/00; B60K 6/445; B60K 6/485; B60K 6/24; B60K 6/26; B60K 2006/268; F02N 2300/106; F02N 2300/2002; F02N 11/006; F02N 11/04; Y02T 10/62
See application file for complete search history.

(56) References Cited

U.S. PATENT DOCUMENTS

| | | | |
|---|---|---|---|
| 3,967,175 A * | 6/1976 | Turley | B60K 6/46 318/258 |
| 6,338,391 B1 * | 1/2002 | Severinsky | B60L 50/61 180/65.23 |
| 2012/0292902 A1 * | 11/2012 | Yamamura | B60L 50/16 290/31 |
| 2018/0362016 A1 * | 12/2018 | Atala | B60W 20/13 |

FOREIGN PATENT DOCUMENTS

CN    107531232 A *    1/2018    ............ F02N 11/08

* cited by examiner

*Primary Examiner* — Justin Holmes
(74) *Attorney, Agent, or Firm* — Slater Matsil, LLP

(57) ABSTRACT

A system includes a vehicle having an engine, a first motor mechanically coupled to a shaft of the engine, a second motor configured to provide torque to the vehicle or the engine in combination with the first motor, and a first controller coupled to at least one of the first motor and the second motor, wherein the first controller is configured such that the first motor and the second motor provide a mechanical torque to rotate the shaft of the engine before the engine is running.

20 Claims, 13 Drawing Sheets

HYBRID ELECTRIC VEHICLE SYSTEM AND CONTROL METHOD

PRIORITY

This application claims the benefit of U.S. Provisional Application No. 62/780,738, filed on Dec. 17, 2018, entitled "Synergetic Control and System of Starter, ISG or BSG, and Engine," which application is hereby incorporated herein by reference.

TECHNICAL FIELD

The present disclosure relates to an electric drive system, and, in particular embodiments, to innovative technologies which improve the design, construction and control of hybrid electric vehicles.

BACKGROUND

As technologies further advance, environmentally friendly motor drive systems have been developed to replace conventional internal combustion engine based vehicles in order to improve fuel efficiency and reduce greenhouse gas emissions. Such motor drive systems are widely employed in various energy-efficient automotive systems including hybrid electric vehicles, electric vehicles, fuel cell electric vehicles and the like.

Recently, hybrid electric vehicles have emerged as an efficient and reliable solution for reducing greenhouse gas emissions, thereby meeting environmental and fuel consumption regulations. Each hybrid electric vehicles is powered by two or more energy sources: an internal combustion engine, and a battery pack, a fuel cell stack or another similar source. These energy sources are combined to power the hybrid electric vehicle efficiently. There are several degrees of hybridization. Hybrid electric vehicles include plug-in hybrid vehicles, full hybrid vehicles, mild hybrid vehicles and micro hybrid vehicles. The technologies in this disclosure can be applied to all hybrid vehicles. In the following discussion, a system with an engine and a battery source will be used to illustrate an embodiment of the present disclosure.

FIG. 1 illustrates a system block diagram of a hybrid vehicle. The hybrid vehicle 100 includes a combustion engine 114, a starter 104, an integrated starter and generator (ISG) 124, a vehicle control unit 102, an engine control unit 112 and an ISG controller 122. As shown in FIG. 1, a shaft 116 is connected to the combustion engine 114. In operation, when the combustion engine is running, the combustion engine 114 rotates the shaft 116. The shaft 116 is mechanically coupled to the wheels of the hybrid vehicle 100.

As shown in FIG. 1, the starter 104 and the ISG 124 are coupled to the shaft 116 through suitable mechanical couplings. The mechanical couplings may be a belt, a gear, a chain or any other means to transform mechanical torque efficiently.

The vehicle control unit 102 exchanges various control commands with the engine control unit 112, and/or the ISG controller 122. The vehicle control unit 102 is configured to generate control commands for controlling the operation of the starter 104. Likewise, the ISG controller 122 exchanges various control commands with the engine control unit 112, and/or the vehicle control unit 102. The ISG controller 122 is configured to generate a variety of control commands for controlling the operation of the ISG 124. The engine control unit 112 is employed to control the operation of the combustion engine 114. The information exchanges shown in FIG. 1 are either unidirectional or bidirectional. For example, the starter 104 may only need to receive commands from the vehicle control unit 102. The ISG 124 may receive signals and power from the ISG controller 122. At the same time, the ISG 124 may provide the status and feedback information to the ISG controller 122. The information exchange may be performed through suitable communication means such as wire connections or a digital bus. The digital bus may be implemented as a controller area network (CAN) bus, a universal serial bus (USB) and the like.

The ISG 124 may be implemented as a low power motor which may be incorporated with the combustion engine 114. The ISG 124 is employed to start and drive the vehicle during the start and stop processes. In addition, the ISG 124 may be used to drive the vehicle or provide additional torque and power to the vehicle during low speed or other suitable operations, thereby improving the gas efficiency and reducing both air pollution and fuel consumption. The ISG 124 is powered by an on-vehicle battery system.

The starter 104 is a low power motor powered by a small on-vehicle battery pack, which may or may not be the same battery system for the ISG 124. The voltage of the battery pack powering the starter 104 is usually about 12 V. Depending on different applications, a 24-V, 48-V or other suitable battery pack may be used to power the starter 104. As shown in FIG. 1, the ISG 124 and the starter 104 are controlled separately. When the ISG 124 and the starter 104 are power by different batteries (or battery packs), a dc/dc power converter may be employed to couple the batteries together, and transfer power between them.

In operation, the starter 104 is primarily used in a cold start. In the cold start, the vehicle has been completely stopped for a long time. The engine is cold and needs a high torque to start. The starter 104 is capable of providing a high torque to start the engine. The ISG 124 is used in a warm start. When the vehicle needs a warm start (e.g., a start shortly after a stop—the engine is warm and needs a lower torque to start), the ISG 124 provides power to start the engine and possibly the vehicle.

In the system configuration shown in FIG. 1, since the ISG 124 and the starter 104 are used separately, they have to be designed and operated to start the engine alone. Such a system configuration results in higher cost and lower reliability. It is advantageous to coordinate the operation of the ISG and the starter to reduce the system cost and improve the operation reliability of the hybrid vehicle.

SUMMARY

These and other problems are generally solved or circumvented, and technical advantages are generally achieved, by preferred embodiments of the present disclosure which provide a high performance implementation of a hybrid electric vehicle.

In accordance with an embodiment, a method comprises configuring an integrated starter and generator (ISG) to provide a first mechanical torque for a vehicle before an engine is running, configuring a starter to provide a second mechanical torque to rotate a shaft of the engine of the vehicle before the engine is running, and reducing a starting current of the starter through a switch network.

In accordance with another embodiment, a system comprises a vehicle having an engine, a first motor mechanically coupled to a shaft of the engine, a second motor configured to provide torque to the vehicle or the engine in combination with the first motor, and a first controller coupled to at least one of the first motor and the second motor, wherein the first controller is configured such that the first motor and the second motor provide a mechanical torque to rotate the shaft of the engine before the engine is running.

In accordance with yet another embodiment, a system comprises a first winding and a second winding of a first motor, a switch network comprises a first switch, a second switch and a diode, wherein the first winding is coupled to a first terminal of a power source, the first switch is coupled to a second terminal of the power source, and wherein the first winding and the first switch are connected in series, the second switch is coupled to the first terminal of the power source, the first winding is coupled to the second terminal of the power source, and wherein the second winding and the second switch are connected in series, and the diode is connected between a common node of the first winding and the first switch, and a common node of the second switch and the second winding, and a controller configured to control the switch network in response to a torque requirement.

An advantage of an embodiment of the present disclosure is using a synergetic control mechanism to control a starter and an ISG of a hybrid electric vehicle.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a high-performance hybrid electric vehicle. The disclosure may also be applied, however, to a variety of electric vehicles. Hereinafter, various embodiments will be explained in detail with reference to the accompanying drawings.

Figure 2:
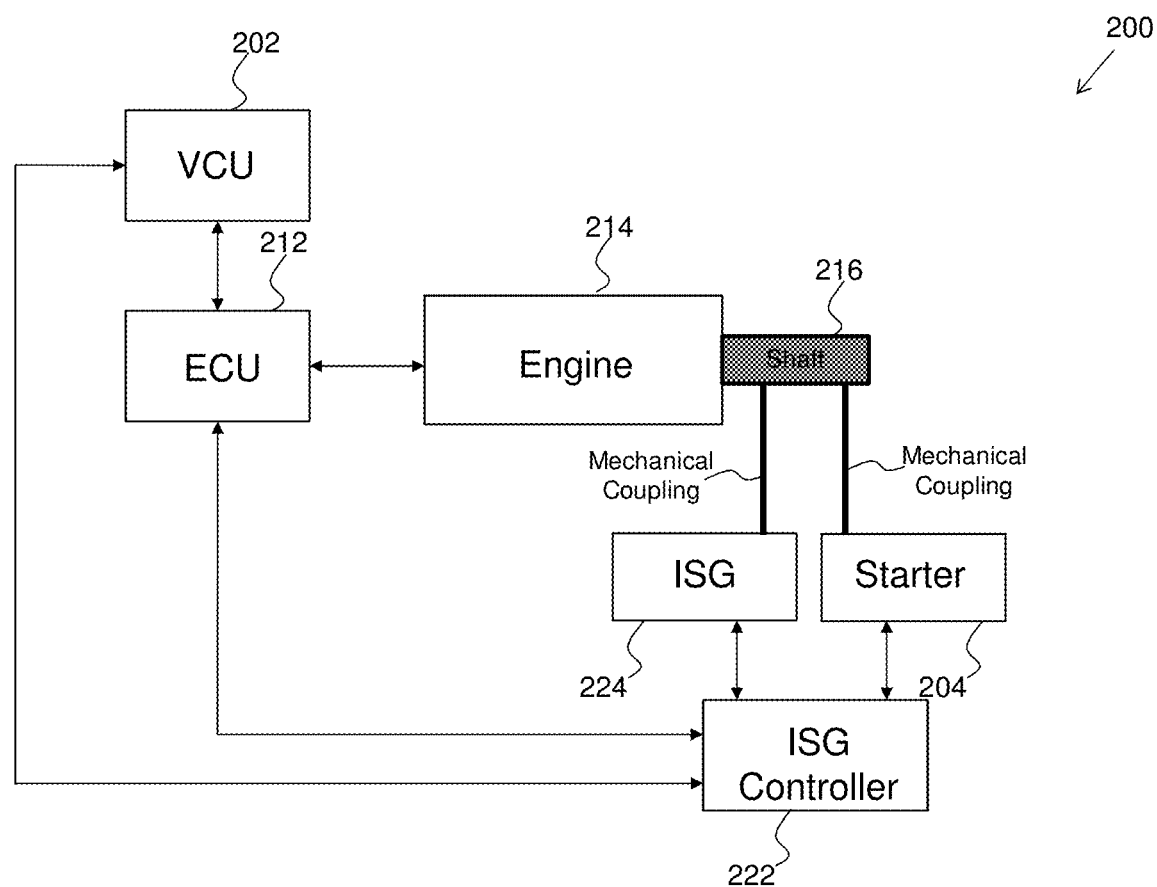
FIG. 2 illustrates a system block diagram of a hybrid electric vehicle in accordance with various embodiments of the present disclosure.

FIG. 2 illustrates a system block diagram of a hybrid electric vehicle in accordance with various embodiments of the present disclosure. The hybrid electric vehicle 200 includes a combustion engine 214, a starter 204, an integrated starter and generator (ISG) 224, a vehicle control unit 202, an engine control unit 212 and an ISG controller 222. As shown in FIG. 2, a shaft 216 is connected to the combustion engine 114. In operation, when the combustion engine 214 is running, the combustion engine 214 rotates the shaft 216. The shaft 216 is usually mechanically coupled to the wheels of the hybrid electric vehicle 200. As shown in FIG. 2, the starter 204 and the ISG 224 may be coupled to the shaft 216 through suitable mechanical couplings. A mechanical coupling may be implemented as a plurality of belts, gears, chains or any other means to transform mechanical torque efficiently. Alternatively, the mechanical output of the ISG 224 may be coupled to other parts, such as wheels of the vehicle to provide torque for the vehicle, which in effect is more or less equivalent to a mechanical coupling to the engine's shaft to provide more system torque. In FIG. 2 and other figures of this disclosure, the ISG 224 is any suitable motors capable of performing motoring and generating functions.

Figure 1:
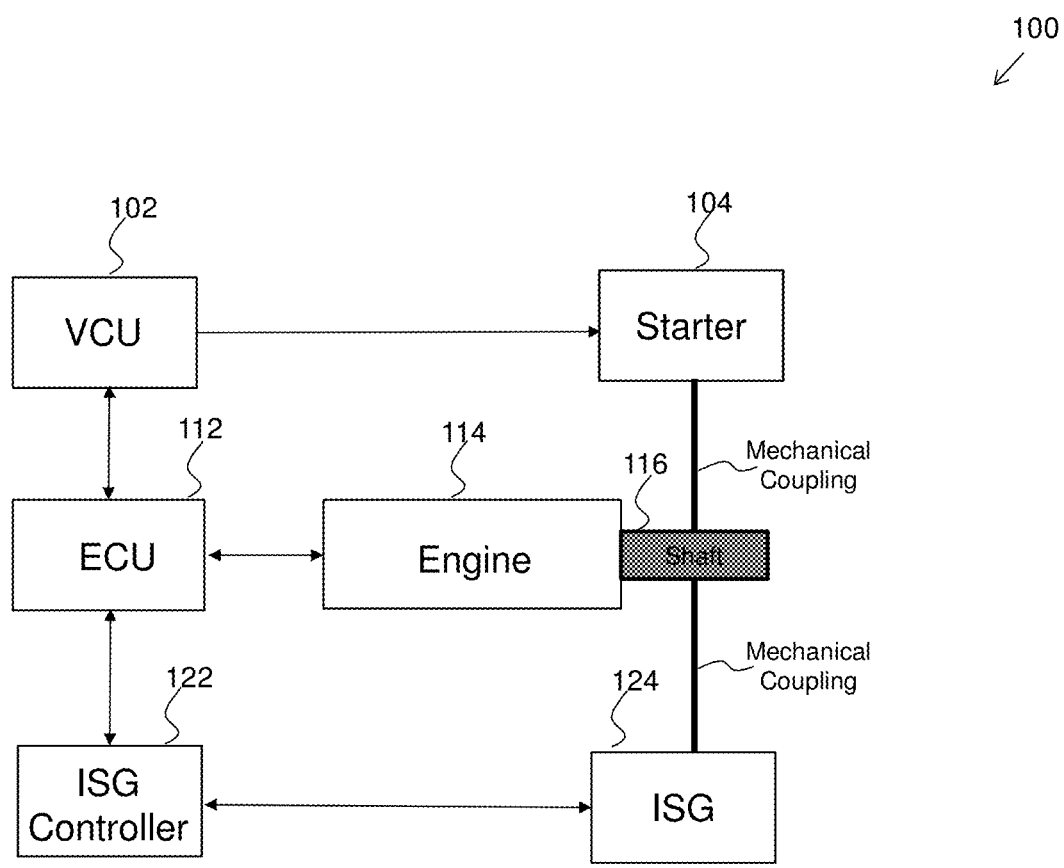
FIG. 1 illustrates a system block diagram of a hybrid vehicle.

Compared to the conventional configuration shown in FIG. 1, the operation of the ISG 224 and the operation of the starter 204 are coordinated through a synergetic control mechanism. The synergetic control mechanism may be implemented in a single controller such as the ISG controller 222. Under such a synergetic control mechanism, both the ISG 224 and the starter 204 are started approximately at the same time when a start command is received by the ISG controller 222 from the engine control unit 212 and/or the vehicle control unit 202. The detailed operating principle of the synergetic control mechanism will be described below with respect to FIGS. 3-4 and 6-8.

In operation, the ISG 224 is controlled to operate in a torque control mode. As a result of operating in the torque control mode, the mechanical torque generated by the ISG 224 can be regulated to a preset value or values.

The starter 204 may operate in a simple control mode without having a tight regulation of the output torque. For example, the voltage or current applied to the starter 204 may be increased by a few steps. Furthermore, the control of the starter 204 may be implemented through dividing the winding of the starter 204 into several groups, each of which having several strands. Each strand is individually powered and controlled. The detailed implementation of dividing the winding of the starter 204 into several groups will be described below with respect to FIG. 9.

Moreover, the winding of the starter 204 may be dynamically adjustable through a tap circuit. By selecting different tap configurations, the current flowing through the starter 204 is controlled accordingly. The detailed implementation of including the tap circuit in the winding of the starter 204 will be described below with respect to FIG. 11.

Additionally, a resistor may be put in series with the winding of the starter 204 to reduce the current flowing through the winding so as to control the operation of the starter 204. The detailed implementation of adding a resistor into the winding of the starter 204 will be described below with respect to FIG. 10.

Figure 3:
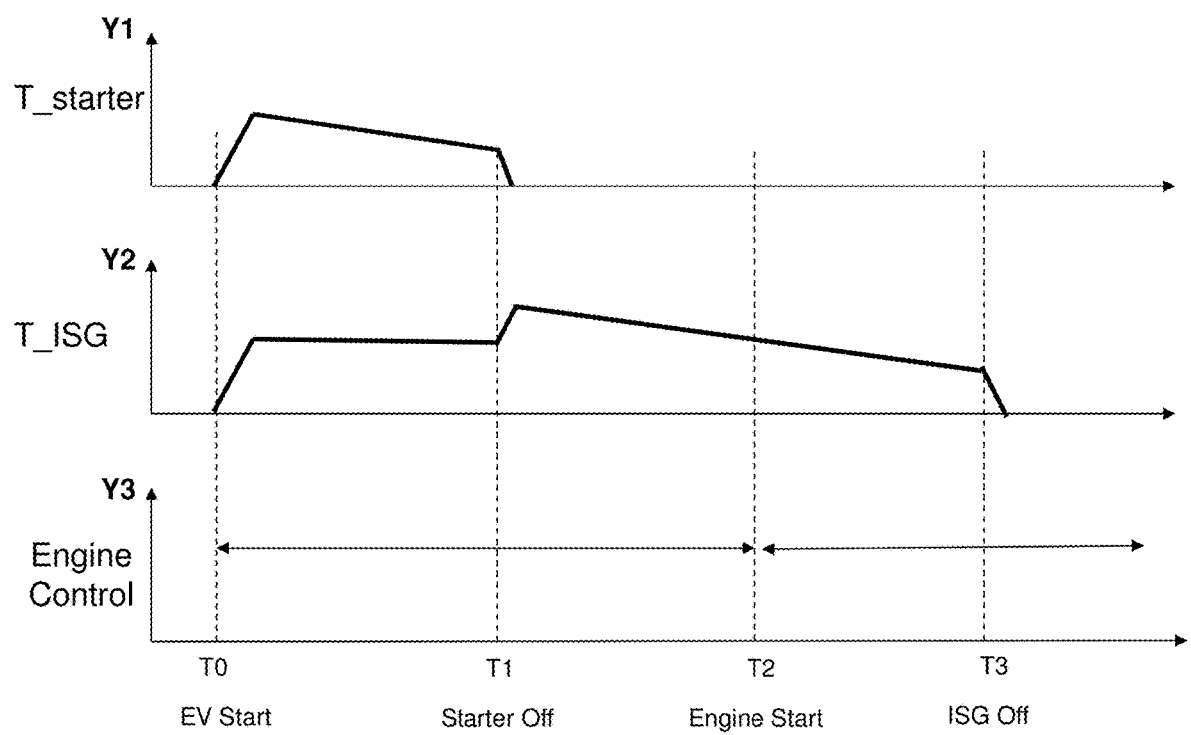
FIG. 3 illustrates a first control timing diagram of the hybrid electric vehicle shown in FIG. 2 in accordance with various embodiments of the present disclosure.

FIG. 3 illustrates a first control timing diagram of the hybrid electric vehicle shown in FIG. 2 in accordance with various embodiments of the present disclosure. The horizontal axis of FIG. 3 represents intervals of time. There are three vertical axes. The first vertical axis Y1 represents the torque generated by the starter 204 shown in FIG. 2. The second vertical axis Y2 represents the torque generated by the ISG 224 shown in FIG. 2. The third vertical axis Y3 represents the status of the combustion engine 214.

At the time instant T0, the hybrid electric vehicle starts. The combustion engine 214 remains off between T0 and T2. The combustion engine 214 has a plurality of inlet valves and exhaust valves. When the combustion engine 214 is off, the inlet valves and exhaust valves may be opened, but fuel is not injected into the combustion chamber of the combustion engine 214. At the time instant T2, the combustion engine 214 receives an engine start command. In response to this command, both the inlet valves and exhaust valves are closed, and fuel is injected into the combustion chamber of the combustion engine 214. The combustion engine 214 starts to run at T2.

From T0 to T1, under the synergetic control mechanism, both the starter 204 and the ISG 224 may provide mechanical torques to rotate the shaft. At T1, the starter 204 stops running in response to a starter off command. The ISG 224 keeps running until receiving an ISG off command at T3. From T0 to T1, under the synergetic control mechanism, the torques produced by the ISG 224 and the starter 204 are summed up and the combined torques are applied to the shaft of the combustion engine 214 for the vehicle through suitable mechanical couplings. From T0 to T1, the starting torque of the vehicle is shared by the ISG 224 and the starter 204. Therefore, neither the ISG 224 nor the starter 204 may need to output the full starting toque.

One advantageous feature of having the synergetic control mechanism shown in FIG. 3 is distributing the starting torque into two motors (ISG 224 and starter 204) helps to reduce the stresses applied to these two motors. The reduced stresses help to improve the reliability of the hybrid electric vehicle, and to reduce the cost, weight and/or size of the ISG 224 and the starter 204.

In operation, when a fault occurs in one of the two motors (the ISG 224 and the starter 204), the motor not having a fault can be used to start the vehicle alone. Under this fault tolerant control scheme, the ISG 224 and the starter 204 form a redundancy system during the startup of the vehicle. The redundancy system helps to further improve the reliability of the vehicle. The fault tolerant control scheme of operating the ISG 224 and the starter 204 will be discussed below with respect to FIG. 4.

Figure 4:
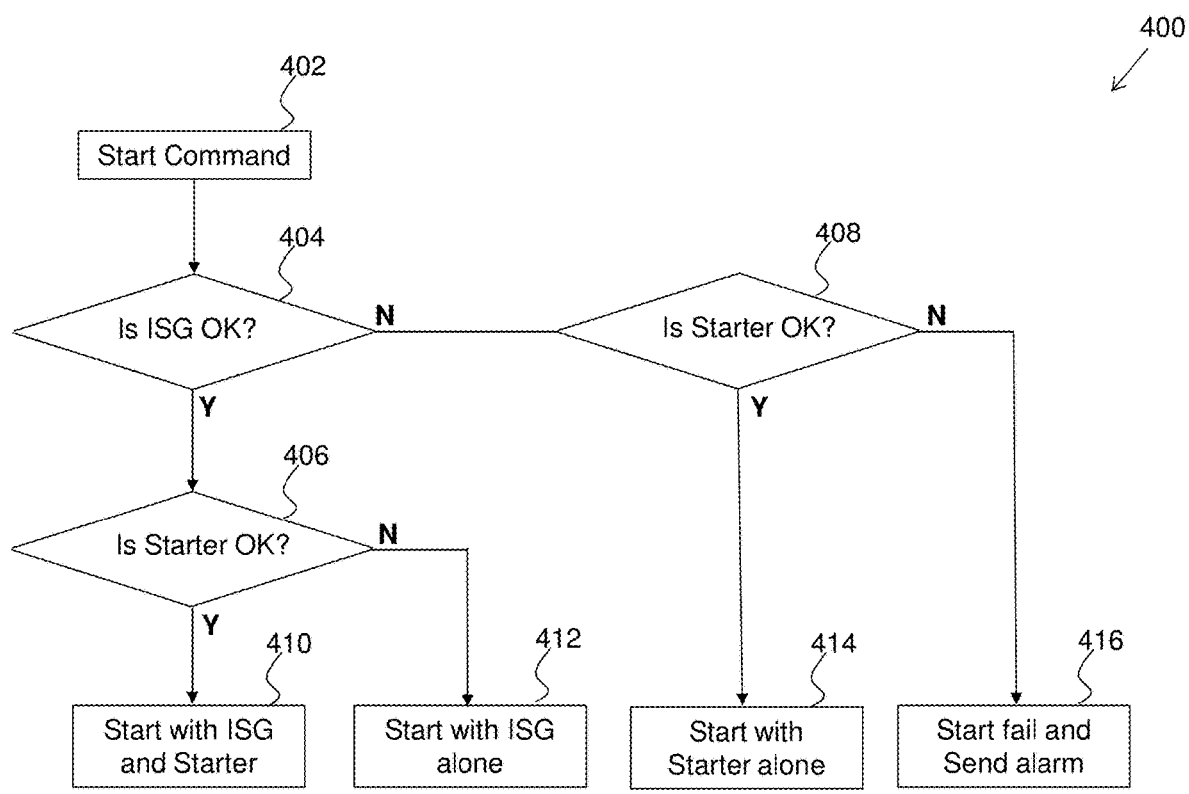
FIG. 4 illustrates a flow chart of a method for controlling the hybrid vehicle shown in FIG. 2 in accordance with various embodiments of the present application.

FIG. 4 illustrates a flow chart of a method for controlling the hybrid vehicle shown in FIG. 2 in accordance with various embodiments of the present application. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

The control method 400 starts at step 402 where a start command is received. At step 404, the status of the ISG is checked. If the ISG is okay (a fault does not occur in the ISG or the ISG controller), the method 400 proceeds to step 406. Also at step 404, if the ISG is not okay (a fault occurs in the ISG or the ISG controller), the method 400 proceeds to step 408.

At step 406, the status of the starter is checked. If the starter is okay (a fault does not occur in the starter or the starter controller), the method 400 proceeds to step 410 where both the ISG and the starter start to run and provide mechanical torques for the vehicle. Also at step 406, if the starter is not okay (a fault occurs in the starter or the starter controller), the method 400 proceeds to step 412 where only the ISG provides a mechanical torque for the vehicle.

At step 408, the status of the starter is checked. If the starter is okay, the method 400 proceeds to step 414 where only the starter provides a mechanical torque for the vehicle. Also at step 408, if the starter is not okay, the method 400 proceeds to step 416 where the startup process fails and an alarm signal is generated and sent to the controller of the vehicle.

Figure 5:
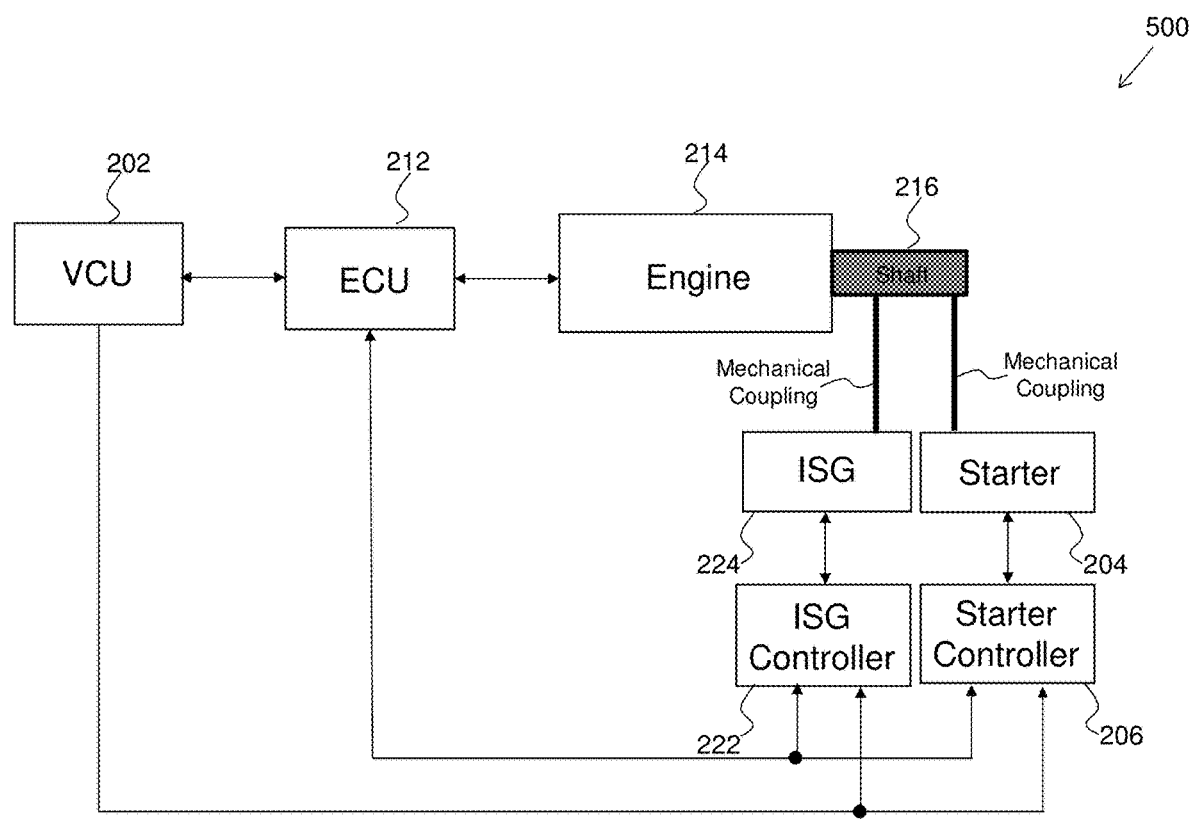
FIG. 5 illustrates a system block diagram of another vehicle in accordance with various embodiments of the present disclosure.

FIG. 5 illustrates a system block diagram of another vehicle in accordance with various embodiments of the present disclosure. The vehicle 500 shown in FIG. 5 is similar to that shown in FIG. 2 except that a starter controller 206 has been included for further improving the performance of the vehicle.

The synergetic control mechanism described above may be implemented in two separate controllers as shown in FIG. 5. As a result of having two separate controllers, any failure in one controller may be isolated from the other as shown in FIG. 5.

In some embodiments, the ISG controller 222 and the starter controller 206 may be physically placed together if needed. In some embodiments, the starter controller 206 may be very simple. The starter controller 206 may be implemented as a rough voltage regulator which can output a few different voltage values. Alternatively, the starter controller 206 may be implemented as a low power regulator for controlling the field winding of a dc motor (starter). Furthermore, the starter controller 206 may be a plurality of relays or contactors for reconfiguring either a field winding or an armature winding of the starter 204. For example, by arranging the plurality of relays or contactors, the starter controller 206 may connect a resistor with the winding to limit the current flowing through the winding. In this case, the command signals for starting the vehicle, including the torque reference of the ISG 224 and/or the torque level of the starter 204, may be sent to both the ISG controller 222 and the starter controller 206 from the vehicle control unit 202 or the engine control unit 212.

In operation, by applying the synergetic control mechanism described above with respect to FIGS. 2-5, the starting burden on each motor has been reduced. In response to this reduced starting burden, the ISG 224 may be designed based on the requirements of the high speed operation, thereby improving various performance indexes such as torque boosting, regenerative braking and the like. The improved performance indexes lead to better system performance and a better performance/cost tradeoff. For example, the size, weight and the cost of the ISG 224 may be reduced, while fuel efficiency of the vehicle has been improved.

In addition, the engine control function may also be adapted in this synergetic control mechanism to allow an easier start by reducing the mechanical resistance from the engine during the initial phase of the start process. For example, to reduce or remove the stroke resistance of the engine in the cylinders, the inlet valves and/or the exhaust valves of the engine may be opened during the first phase of the start process or during a low speed operation. Since the inlet valves and/or the exhaust valves of the engine are open, the engine is not running, and the engine can stay in this "free run" mode until it is required to fire up to provide a mechanical torque.

In operation, when the starter 204 stops and shifts its load to the ISG 224, the ISG 224 may be controlled to accept the load and keep the speed approximately constant in a short period after the load is shifted from the starter 204 to the ISG 224. Such a smooth transition helps to reduce the impact of the stop of the starter 204. This load shift process is short and smooth, so the passenger cannot feel this transition. To achieve this smooth transition, in the short duration after the starter stops, the ISG 224 may be controlled to operate in a constant-speed mode. Alternatively, the ISG torque reference may be modified so as to maintain a substantially constant speed by keeping the total torque from the ISG 224 and the starter 204 about the same.

Figure 6:
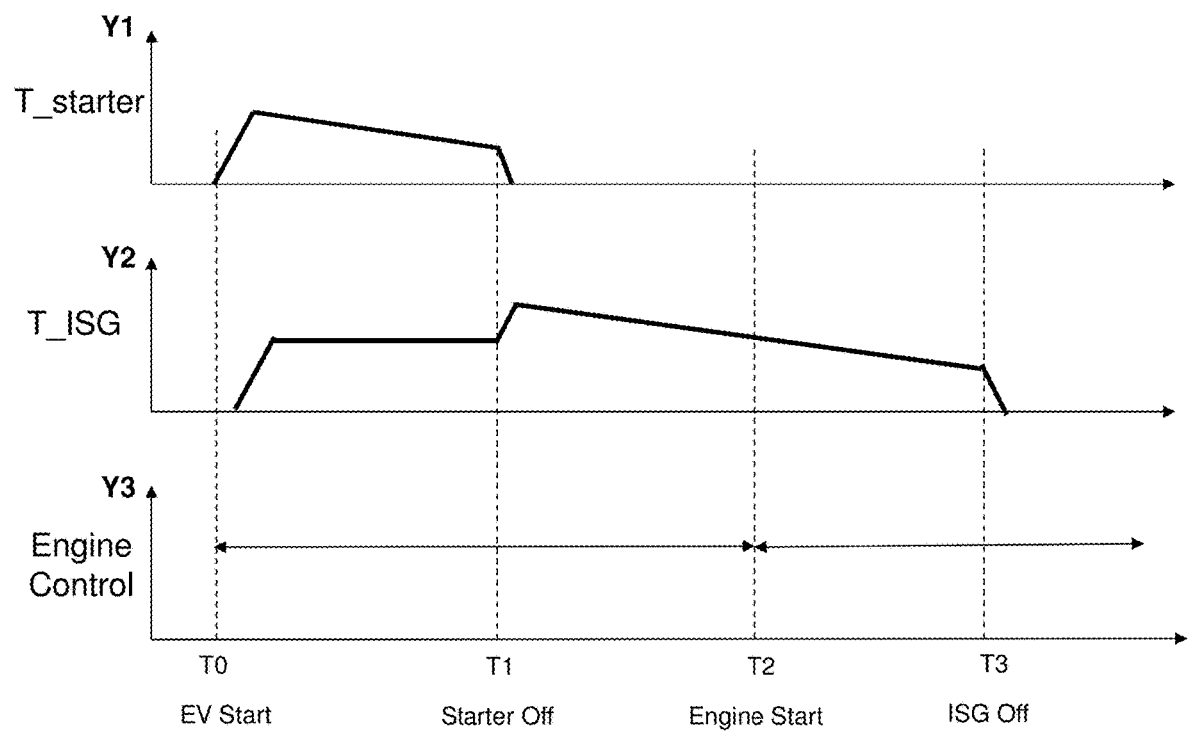
FIG. 6 illustrates a second control timing diagram of the vehicle shown in FIG. 2 in accordance with various embodiments of the present disclosure.

FIG. 6 illustrates a second control timing diagram of the vehicle shown in FIG. 2 in accordance with various embodiments of the present disclosure. The control timing diagram shown in FIG. 6 is similar to the control timing diagram shown in FIG. 3 except that there is a delay between the start time of the starter 204 and the start time of the ISG 224. More particularly, the starter 204 starts to run at T0. After a predetermined delay, the ISG 224 starts to run. One advantageous feature of having the delay shown in FIG. 6 is the delay can be used as a control variable to further improve the operation of the vehicle.

Figure 7:
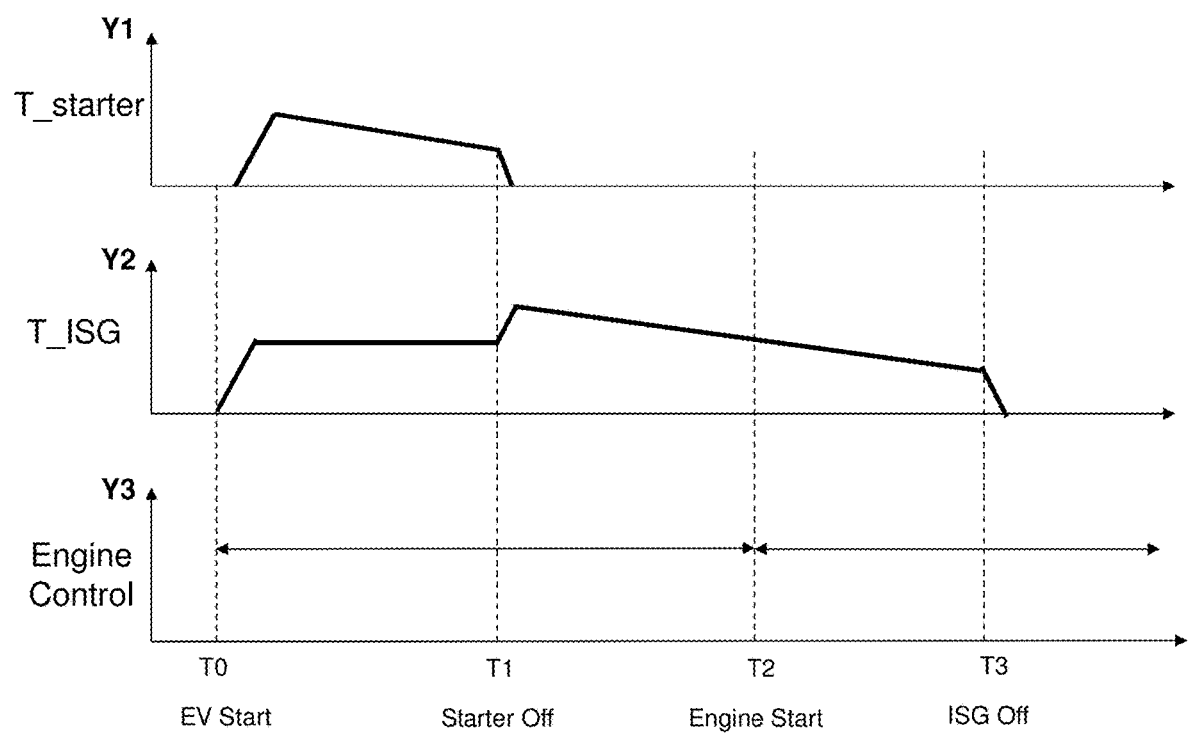
FIG. 7 illustrates a third control timing diagram of the vehicle shown in FIG. 2 in accordance with various embodiments of the present disclosure.

FIG. 7 illustrates a third control timing diagram of the vehicle shown in FIG. 2 in accordance with various embodiments of the present disclosure. The control timing diagram shown in FIG. 7 is similar to the control timing diagram shown in FIG. 3 except that there is a delay between the start time of the starter 204 and the start time of the ISG 224. More particularly, the starter 204 starts to run at T0. After a predetermined delay, the starter 204 starts to run. One advantageous feature of having the delay shown in FIG. 7 is the delay can be used as a control variable to further improve the operation of the vehicle.

Figure 8:
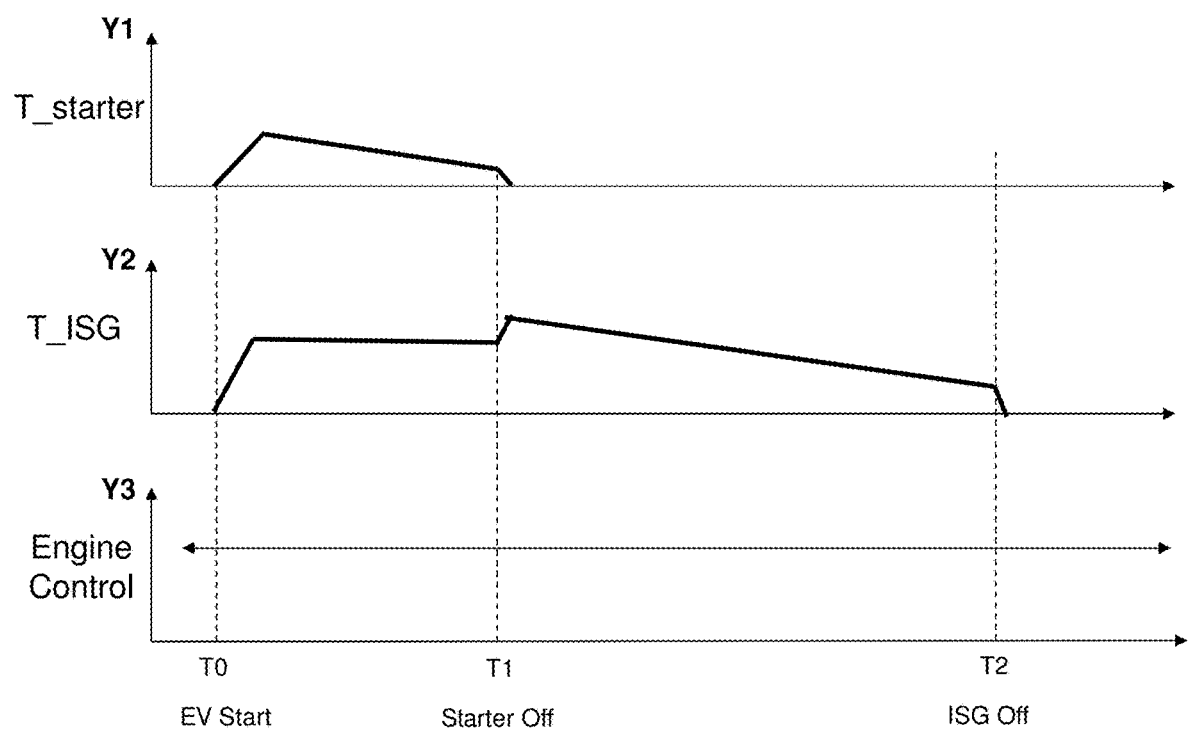
FIG. 8 illustrates a fourth control timing diagram of the vehicle shown in FIG. 2 in accordance with various embodiments of the present disclosure.

FIG. 8 illustrates a fourth control timing diagram of the vehicle shown in FIG. 2 in accordance with various embodiments of the present disclosure. The control timing diagram shown in FIG. 8 is similar to the control timing diagram shown in FIG. 3 except that the ISG 224, the starter 204 and the combustion engine 214 are running at the same time to form a torque booster. From T0 to T2, the combustion engine 214 is running. As shown in FIG. 8, from T0 to T1, the ISG 224, the starter 204 and the combustion engine 214 are running at the same time.

In a normal vehicle start process, after the start up, the starter 204 is turned off in a short time (a few seconds). ISG 224 may continue running for a longer period, and stop when the torque generated by the ISG 224 is not required by the vehicle. The ISG may start again when the vehicle needs more torque during its operation (torque boosting). Alternatively, the starter 204 may be controlled to operate for a longer time to provide torque boosting independently. Furthermore, as shown in FIG. 8, the ISG 224 and the starter 204 work together to provide additional torque.

It should be noted that the starter 204 is designed with limited thermal capacity. Likewise, the ISG 224 may be designed with limited thermal capacity too. As such, the torque output of the starter 204 and/or the ISG 224 during the torque boosting process should be limited to a preset value or adjusted according to different operating conditions such as the temperature of the machine, the environmental temperature and the like. Alternatively, the ISG 224 may be designed to operate for a longer time, and independently from the engine. For example, when the operation of the vehicle does not require a high torque, the torque may be provided by the ISG motor alone in certain operation modes. Such pure-electric operation may be advantageous in achieving good energy efficiency.

It should be noted that the ISG 224 is also required to charge the battery of the vehicle. The ISG 224 may operate in two different operating modes, namely a motor (motoring) mode and a generator (generating) mode. The ISG 224 can be used to recover mechanical energy from the vehicle. On the other hand, the starter 204 may not need to work in the generator mode, which can be used to simplify and improve the control of the starter 204.

According to the synergetic control scheme described above, the starter 204 is used more often than the starter controlled by a standard control scheme. In order to have a reliable system, it is important to reduce the stress (e.g., current stress) on the elements of the starter.

In some embodiments, the starter 204 is implemented as a dc motor for low speed operation. The dc motor has an armature winding. If permanent magnets are not used in the dc motor, the starter 204 also has a field winding. A starter having both an armature winding and a field winding is used as an example below. Traditionally, the starter is designed to produce a high torque at the start (e.g., the start from a speed approximately equal to zero). The starter may work only for a short duration ranging from a fraction of a second to a few seconds each time. The full battery voltage (e.g., 12 V) is applied to the starter during the starting operation. If the current in the armature winding and/or the field winding can be reduced during the operation, the reliability and life time of the starter can be significantly improved. FIGS. 9-12 below illustrate various structure and control methods for reducing the current in the armature winding and/or the field winding of the starter.

Figure 9:
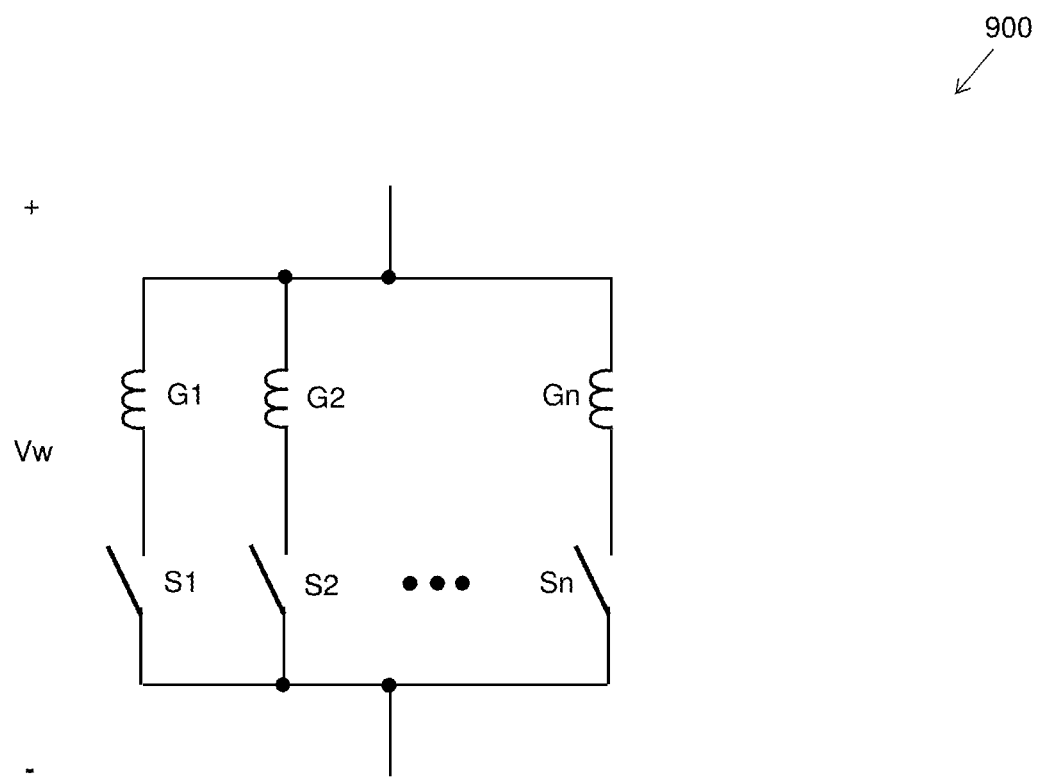
FIG. 9 illustrates a first implementation of the starter shown in shown in FIG. 2 in accordance with various embodiments of the present disclosure.

FIG. 9 illustrates a first implementation of the starter shown in shown in FIG. 2 in accordance with various embodiments of the present disclosure. The winding of the starter 900 is divided into a plurality of groups (G1, G2, ... Gn), with each group containing one or more strands. Each group includes one switch connected in series with the corresponding strand or strands. As shown in FIG. 9, the plurality of groups is connected in parallel between two terminals of the starter 900. A dc voltage Vw is applied to the two terminals of the starter 900.

In operation, each group shown in FIG. 9 can be controlled and powered separately by controlling the on/off of the switches (S1, S2, ... Sn). When the start process requires a reduced current flowing through the starter 900, some switches are turned off so that few groups are powered. The switches may be implemented as suitable switching devices such as relays, contactors, metal-oxide-semiconductor field-effect transistors (MOSFETs), insulated-gate bipolar transistors (IGBTs), any combinations thereof and the like.

Figure 10:
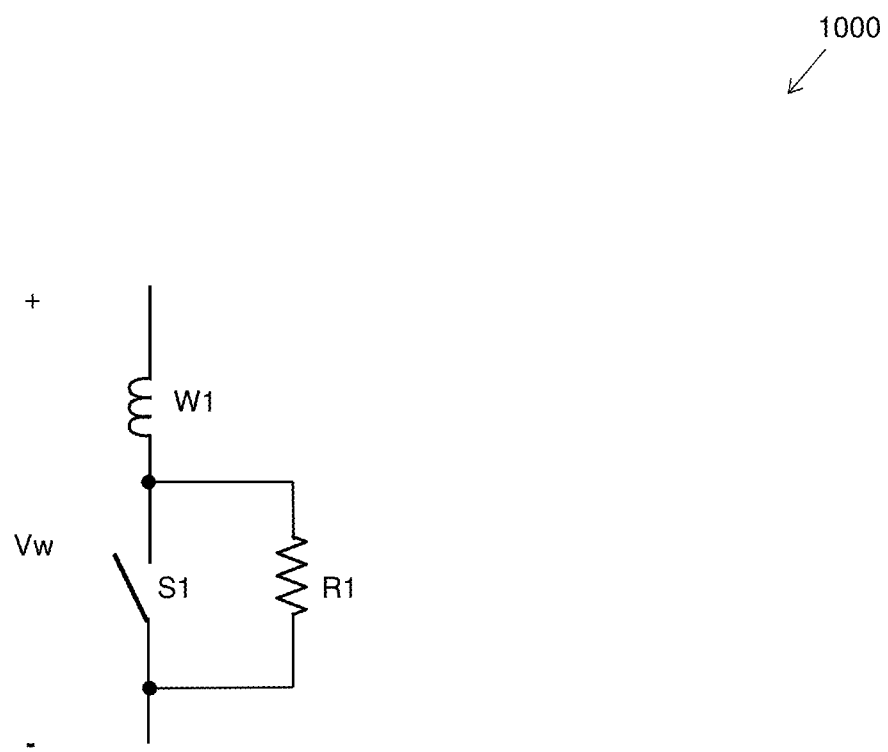
FIG. 10 illustrates a second implementation of the starter shown in shown in FIG. 2 in accordance with various embodiments of the present disclosure.

FIG. 10 illustrates a second implementation of the starter shown in shown in FIG. 2 in accordance with various embodiments of the present disclosure. The starter 1000 includes a winding W1, a resistor R1 and a switch S1. The resister R1 is connected in series with the winding W1. The switch S1 is connected in parallel with the resistor R1.

During the start of the vehicle, when a reduced current is required, the switch S1 is turned off. The resistor R1 helps to reduce the current flowing through the winding W1. The winding structure shown in FIG. 10 is especially useful for the armature winding which is exposed to a high current at the beginning of a start process. The resistor R1 may be implemented as a temperature or frequency sensitive device such as a negative temperature coefficient thermistor.

In operation, when a high starting torque is necessary (e.g., in a cold start or a starter-alone start), the switch S1 may be closed from the beginning of the start. By bypassing the resistor R1, a high current and a corresponding high torque are provided. On the other hand, if a starting torque from the starter can be reduced (e.g., in a starter and ISG synergetic start), at the beginning of the start, the switch S1 is open. The resistor R1 reduces the current flowing through the winding W1. After a predetermined duration, the switch S1 may be closed to reduce power losses.

Figure 11:
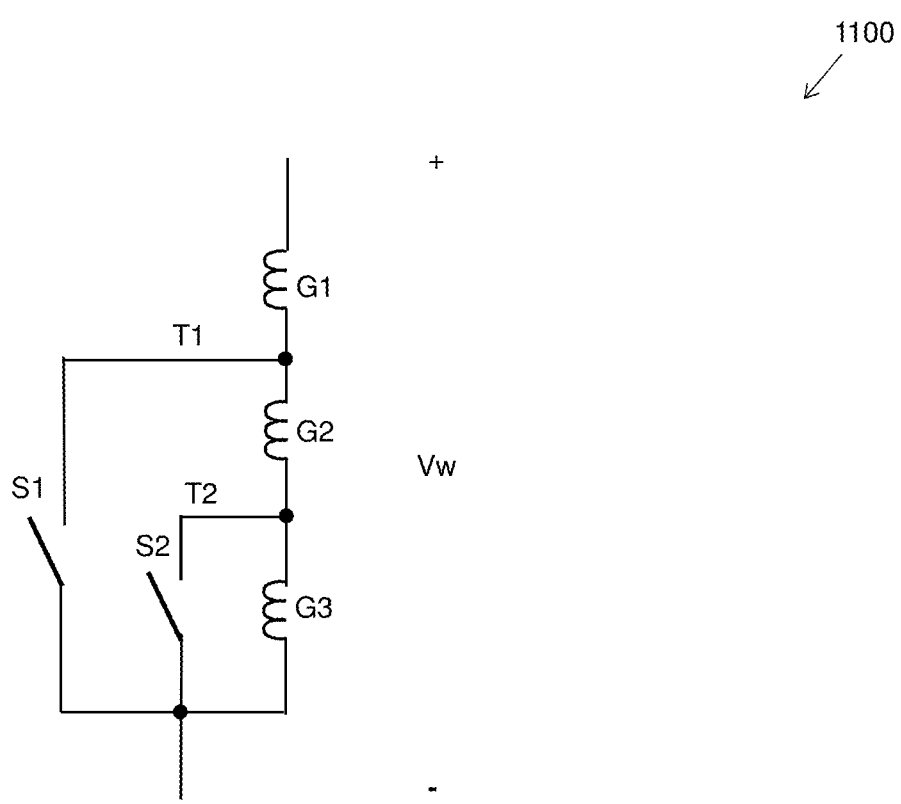
FIG. 11 illustrates a third implementation of the starter shown in shown in FIG. 2 in accordance with various embodiments of the present disclosure.

FIG. 11 illustrates a third implementation of the starter shown in shown in FIG. 2 in accordance with various embodiments of the present disclosure. The winding of the starter 1100 has different taps. The taps function as selectors. By configuring the on/off of the switches S1 and S2 shown in FIG. 11, different winding currents flows through the windings (G1, G2 and G3). The taps may be coupled to and controlled by a multi-throw switch or multi single-throw switches. FIG. 11 shows that the starter 1100 includes two taps T1 and T2. By controlling the on and off of the switches S1 and S2, the current flowing through the starter 1100 may be adjusted accordingly.

Figure 12:
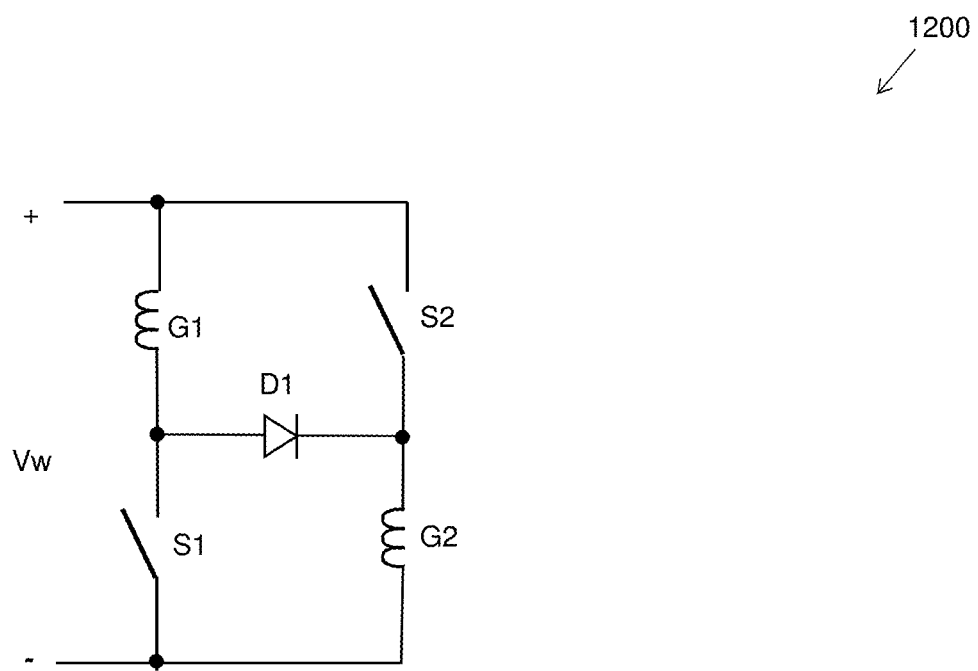
FIG. 12 illustrates a fourth implementation of the starter shown in shown in FIG. 2 in accordance with various embodiments of the present disclosure.

FIG. 12 illustrates a fourth implementation of the starter shown in shown in FIG. 2 in accordance with various embodiments of the present disclosure. The winding of the starter 1200 may be divided into several groups (each group containing one or more strands). Switches are arranged to change the configurations of the groups (series connection or parallel connections of the groups). FIG. 12 shows an example of a starter winding have two groups (G1 and G2). When switch S1 is closed, group G1 is activated. When switch S2 is closed, group G2 is activated. When both switches are closed, groups G1 and G2 are both activated, and groups G1 and G2 are connected in parallel. When both S1 and S2 are off, groups G1 and G2 are both activated, but groups G1 and G2 are connected in series through diode D1, resulting in a high resistance mode.

Please note that switches S1 and S2 may be integrated into one switch (with two sets of contacts). Furthermore, switches S1 and S2 may be controlled by one signal. In this way, controlling the switches can result in different currents flowing through the winding. For example, if the winding is the armature winding of the starter, both groups G1 and G2 can be activated and connected in parallel if the required torque at the start is very high, or the starter operates at a high speed. When the starting torque from the starter is low, only one group is activated. Furthermore, to reduce the current in the winding, G1 and G2 can be connected in series if a low torque is needed.

The connection of the field winding and the armature winding can be controlled by a switch network. When a lower current (and thus a lower torque) is desired, the field winding can be put in series with the armature winding. When a higher current (and thus a higher torque) is needed, the field winding can be put in parallel with the armature winding. The configuration of FIG. 12 can be used for this purpose. Under this application, one of G1 and G2 is a field winding, and the other is an armature winding.

It should be noted that the techniques shown in FIGS. 9-12 can be applied to both the armature winding and the field winding of a starter, and can also be used in combination to improve the design of the starter.

Figure 13:
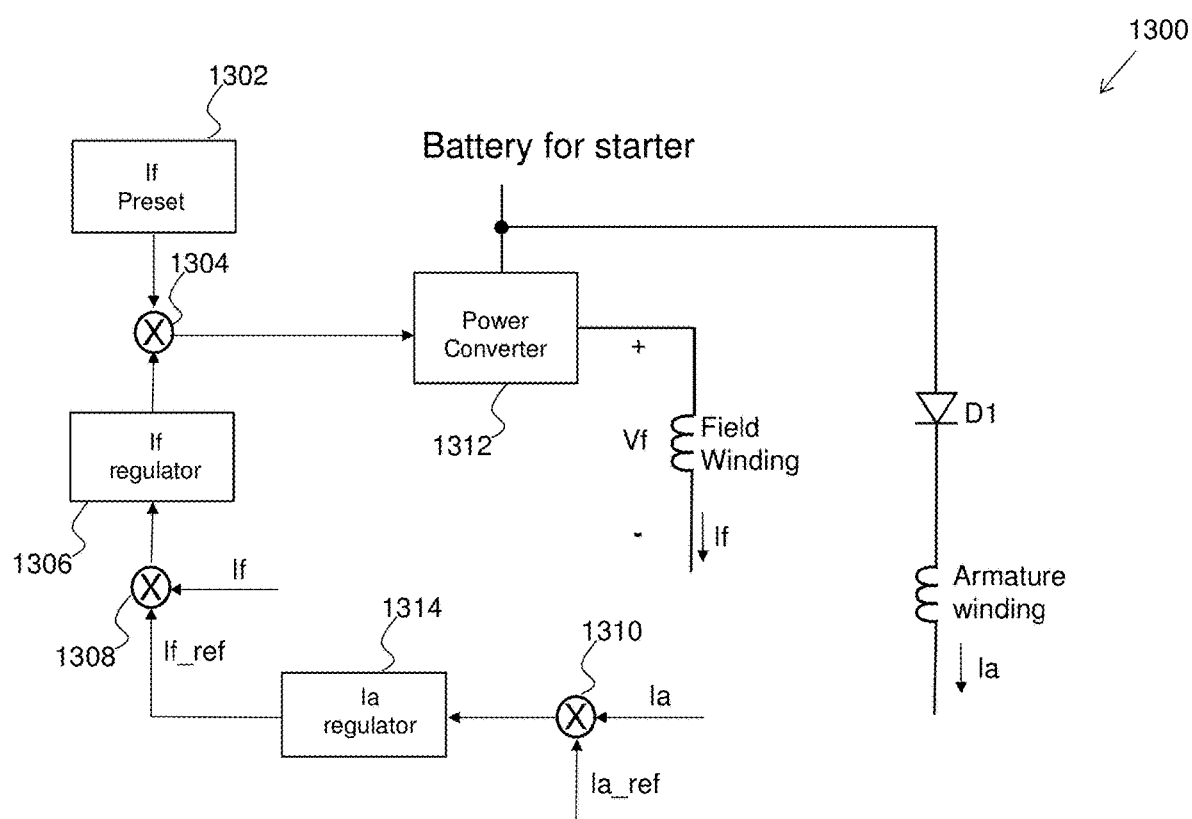
FIG. 13 shows a block diagram of a control loop for controlling the starter in accordance with various embodiments of the present disclosure.

In operation, there may be a need to operate the starter at a higher speed to provide torque boosting in some applications. To reduce the power loss and the cost of the vehicle, it is desirable to control the field winding current to achieve a rough torque control for the starter. Generally, the field current should be reduced at the higher speed, but kept at a right value so the armature current is kept reasonably low to produce enough torque while reducing the power loss and the stress inside the starter. The current flowing through the field winding can be controlled by a power converter through monitoring and limiting the armature current to an acceptable value. FIG. 13 below illustrates the details of controlling the current flowing through the field winding.

FIG. 13 shows a block diagram of a control loop for controlling the starter in accordance with various embodiments of the present disclosure. As shown in FIG. 13, the armature current Ia is compared with a predetermined armature current reference Ia_ref at a first summer 1310. The difference between Ia and Ia_ref is fed into an armature current regulator 1314. The armature current regulator 1314 generates a field current reference If_ref. The field current If and the field current reference If_ref are compared at a second summer 1308. The difference between If and If_ref is fed into a field current regulator 1306. The output of the field current regulator 1306 and a preset If are compared at a third summer 1304. The output of the third summer 1304 is used to control the current flowing through the field winding through a power converter 1312.

Please note that an optional diode D1 may be added to the armature winding so even if the field current is too high at an operation speed, the armature winding current cannot be negative. This diode helps to protect the system and improve the performance of the system. The block diagram shown in FIG. 13 allows the power converter 1312 to be designed to output a relatively high field winding current at the beginning of torque boosting or during transients so that the armature current always starts from a low value or zero, which helps to reduce the inrush current, thereby achieving a soft start of the starter.

The power converter 1312 can be a linear regulator, a switching regulator or any combination thereof. Because the field winding has a lower power rating than the armature winding, the cost addition of this regulator is relatively low. The armature current reference Ia_ref is determined in consideration with the speed of the engine and the desired torque from the starter according to a variety of operation conditions and objectives such as environment/stator/controller temperature, power loss, battery voltage, desired torque from the starter and the like.

The armature current regulator 1314 takes the input of this reference and the actual or estimated armature current Ia, and outputs a reference If_ref for the field current, then a field current regulator tries to control the field current to the desired value. The field current feedback can be obtained by measuring the actual field winding current If or by estimating the field winding current from the field winding voltage Vf, because the field winding can be modeled as a resistor in steady-state operation for simplified control.

The field winding current preset is decided according to the speed of the engine, the battery voltage, and/or desired torque from the starter, to make sure that when the closed feedback loop control is not enabled at the beginning of the start, an appropriate field current exists so that the armature current starts from zero or a low value to avoid a high inrush current.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
configuring an integrated starter and generator (ISG) to provide a first mechanical torque for a vehicle with an engine;
configuring a starter with a plurality of windings to provide a second mechanical torque to rotate a shaft of the engine of the vehicle simultaneously to the ISG in an operation mode; and
configuring a switch network to make different connections of the plurality of windings in response to different operation modes and reduce a current of the starter during an operation mode.

2. The method of claim 1, further comprising:
configuring the ISG and the starter such that one of them starts before the other.

3. The method of claim 1, further comprising:
controlling the engine to have lower mechanical resistance before the engine is started.

4. The method of claim 1, further comprising:
configuring the plurality of the windings of the starter through controlling the switch network such that the starter outputs a mechanical torque at a predetermined speed.

5. The method of claim 1, further comprising:
after starting the engine, configuring the ISG or the starter running to provide torque to the vehicle.

6. The method of claim 1, wherein:
the plurality of windings of the starter is divided into a plurality of winding groups, and wherein each winding group is connected in series with a switch.

7. The method of claim 1, wherein:
the switch network comprises a resistor in parallel with a switch.

8. The method of claim 1, wherein:
the switch network comprises a plurality of switches coupled to a tap circuit.

9. The method of claim 1, wherein:
the starter comprises a first winding and a second winding; and
the switch network comprises a first switch, a second switch and a diode, and wherein:
the first winding is coupled to a first terminal of a power source, the first switch is coupled to a second terminal of the power source, and the first switch is connected in series with the first winding;
the second switch is coupled to the first terminal of the power source, the second winding is coupled to the second terminal of the power source, and the second switch and the second winding are connected in series; and
the diode is connected between a common node of the first winding and the first switch and a common node of the second switch and the second winding.

10. A system comprising:
a vehicle having an engine;
a first motor with a plurality of windings and mechanically coupled to a shaft of the engine;
a second motor mechanically coupled to the first motor and configured to provide torque to the vehicle or the engine in combination with the first motor; and
a first controller with a switch network configured to make different connections of the plurality of windings in response to different operation modes and reduce a current of the first motor during an operation mode.

11. The system of claim 10, wherein:
one of the first motor and the second motor is configured to drive the vehicle after the vehicle is started.

12. The system of claim 10, wherein:
the first motor and the second motor are configured to output a mechanical torque simultaneously to start the engine, and the second motor is configured to operate in a constant speed mode after the first motor stops.

13. The system of claim 10, further comprising:
a plurality of switches coupled to a tap circuit of the first motor, wherein the plurality of switches are controlled according to a torque required from the first motor.

14. The system of claim 10, wherein:
the plurality of windings are coupled to a plurality of switches in the switch network, and wherein each winding is connected in series with a switch, and the plurality of switches are controlled according to a torque required from the first motor.

15. The system of claim 10, further comprising:

a power converter coupled to a field winding of the first motor, wherein the power converter is controlled to regulate a current in an armature winding of the first motor, and wherein the armature winding is configured so that it has a low inrush current.

16. A system comprising:

a first winding and a second winding of a first motor;

a switch network comprises a first switch, a second switch and a diode, wherein:

the first winding is coupled to a first terminal of a power source, the first switch is coupled to a second terminal of the power source, and wherein the first winding and the first switch are connected in series;

the second switch is coupled to the first terminal of the power source, the first winding is coupled to the second terminal of the power source, and wherein the second winding and the second switch are connected in series; and the diode is connected between a common node of the first winding and the first switch, and a common node of the second switch and the second winding; and a controller configured to control the switch network in response to a torque requirement.

17. The system of claim 16, wherein:

one of the first winding and the second winding is an armature winding, and the other winding is a field winding.

18. The system of claim 16, further comprising:

an engine; and a second motor, wherein the controller is configured to control the first motor and the second motor to provide a torque to start the engine.

19. The system of claim 18, wherein:

after the engine is started, the first motor and the second motor are configured to provide torque to drive a vehicle.

20. The system of claim 16, wherein:

the controller is configured to control the switch network to reduce a start current of the first motor.

\* \* \* \* \*